G. REISINGER.
OPTICAL INSTRUMENT.
APPLICATION FILED MAR. 23, 1917.

1,267,592.

Patented May 28, 1918.
2 SHEETS—SHEET 1.

Inventor:
George Reisinger
by Davis & Simms
his attorneys

G. REISINGER.
OPTICAL INSTRUMENT.
APPLICATION FILED MAR. 23, 1917.

1,267,592.

Patented May 28, 1918.
2 SHEETS—SHEET 2.

Inventor:
George Reisinger
by Davis & Simms
his attorneys

UNITED STATES PATENT OFFICE.

GEORGE REISINGER, OF ROCHESTER, NEW YORK, ASSIGNOR TO CROWN OPTICAL COMPANY, OF ROCHESTER, NEW YORK, A CORPORATION.

OPTICAL INSTRUMENT.

1,267,592.

Specification of Letters Patent. Patented May 28, 1918.

Application filed March 23, 1917. Serial No. 157,051.

*To all whom it may concern:*

Be it known that I, GEORGE REISINGER, a subject of the Emperor of Austria-Hungary, and resident of Rochester, in the county of Monroe and State of New York, have invented certain new and useful Improvements in Optical Instruments, of which the following is a specification.

The present invention relates to optical instruments, and more particularly to the type which employs reflecting prisms, an object of this invention being to provide a holding or securing means for the prisms adapted to permit the ready adjustment of the prisms upon their seats without imposing any strains on the prisms tending to distort or fracture the same.

To this and other ends, the invention consists of certain parts and combinations of parts all of which will be hereinafter described, the novel features being pointed out in the appended claims.

In the drawings:—

Figure 1:
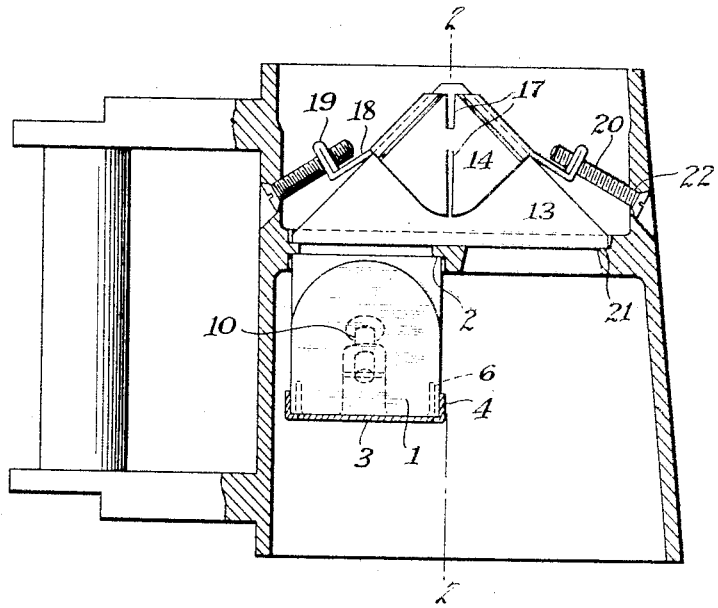
Figure 1 is a sectional view through a portion of the casing of a binocular telescope, showing two prisms therein with the adjusting means therefor.
Figure 3:
Fig. 3 is a top view of the construction shown in Fig. 1.
Figure 2:
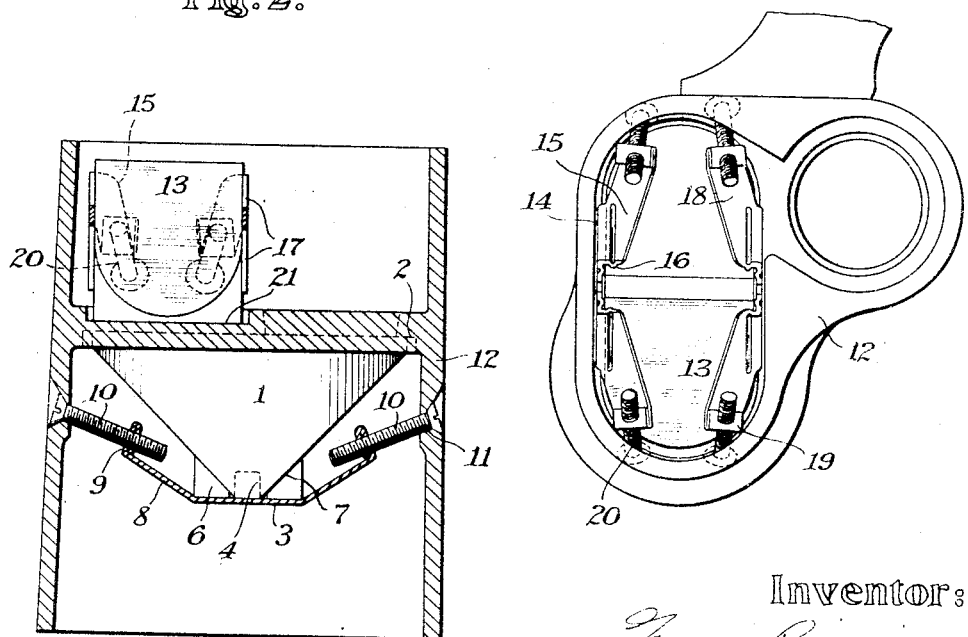
Fig. 2 is a section on the line 2—2, Fig. 1.
Figure 4:
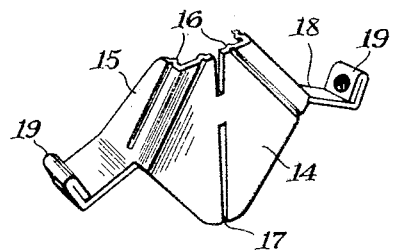
Fig. 4 is a detail perspective view of one of the saddle members of the upper prism.
Figure 5:
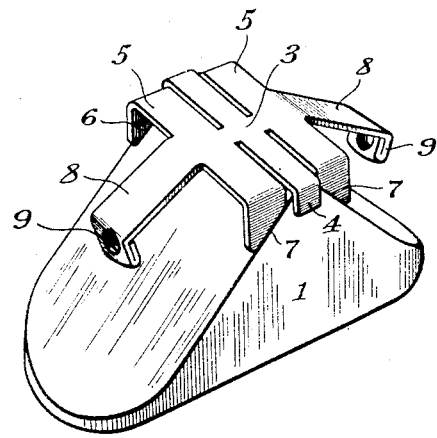
Fig. 5 is a detail perspective view of the lower saddle member, showing the coöperation thereof with its prism.

In binocular telescopes it is customary to employ on each half of the instrument, a pair of prisms one arranged above the other, the upper one optically connecting with the objective and the lower one optically connecting with the eyepiece. To the end that the images received by the two eyepieces of the binoculars will be coincident to produce a stereoscopic effect, it is customary to mount the prisms in such a manner that they may be shifted in order to bring the two images in coincidence, this adjustment correcting the many errors in the optical parts of the instrument as well as in the mounting of such parts. In effecting adjustments of the prisms it is desirable that both of the prisms be shiftable longitudinally, and at least one of the prisms have provision for a lateral movement.

Considerable difficulties have been met with in holding the prisms to their seats in such a manner that they will not be shifted under a jarring action, and at the same time strains or stresses will not be produced in the prisms tending to distort the same or cause a fracture thereof. These difficulties have been overcome by the present improvements.

In the embodiment of the invention shown in Figs. 1–5, two forms of the adjusting and holding means are employed, one permitting only a longitudinal movement of the prism, while the other permits both a longitudinal and lateral or transverse movement. Both of these forms have a common principle of operation. Referring first to the means for securing the lower prism 1 to its seat 2, it embodies a saddle preferably formed from a single piece of metal and adapted to coöperate with the two angularly arranged faces of the prism as well as with the apex and the opposite side faces of the prism. This saddle has a central portion 3 bearing against the apex, and having at opposite ends laterally turned portions 4 for coöperating with the opposite side faces of the prism 1. Also provided on opposite sides of the central portion 3 are two pairs of resilient or spring arms 5 whose ends are deflected laterally at 6 and beveled at 7 to coöperate with the angularly arranged faces of the prism 1. Spring arms 8 are extended in opposite directions from the saddle, and carry at their extreme ends screw members 9 preferably in the form of nuts, the arms 8 being preferably bent or deflected laterally toward the prism seat, so that the axis of the nut or screw portion 9 will intersect the plane of the prism seat. These nuts 9 are engaged by two screw members 10, the axes of which converge and intersect the plane of the prism seat. These screw members 10 are preferably mounted to turn in a part fixed with reference to the prism seat as, for instance, in engagement with the walls 11 of openings formed in the casing 12 of the instrument, the mounting of the screw being such that the latter may turn freely, but does not move axially.

By the foregoing arrangement the prism 1 may be moved in the direction of the length of its seat by adjusting or turning the screws 10, the width of the seat being substantially equal to the width of the prism so that the latter is held against lateral movement. At the same time the screws coöperate with the screw parts on the saddle in such a manner as to firmly hold the prism 1 to its seat. The nuts or screw parts 9 being supported by the spring arms 8 are permitted to shift slightly, while at the same time the screws may have a slight rocking movement in engagement with the walls 11 of the openings. The prism is engaged by portions on the saddle which are resiliently mounted, and these portions connect with the prism near the edge of the latter, where the strains, if produced, are less likely to affect the optical action of the prism.

The adjusting means for the upper prism 13 comprises a saddle form of two members, each member being a duplicate of the other and comprising preferably a central portion 14 lying on one side of the prism and connecting two portions 15 which engage the angularly arranged faces of the prism, engagement with the prism being established by means of ribs 16 pressed up from the metal of which the saddle member is formed. In order that the two portions 15 may be relatively movable to adapt themselves to the surfaces of the two angularly arranged faces, the central portion 14 is provided with slots 17. Each saddle member preferably has two oppositely extending spring arms 18, at the free ends of which are mounted screw members 19 in the form of nuts. The nuts 19 are in turn engaged by screws 20, the axes of which converge and intersect the plane of the prism seat 21 and also intersect the longitudinal axis of the prism. These screws 20 turn loosely in engagement with the walls 22 of openings formed in the casing 12, so that they have a free rotary or turning movement, but at the same time do not move axially. A slight rocking action of the screws in the casing 12 is provided to permit the screws to adapt themselves to the shifting of the prism on its seat.

By the arrangement shown for adjusting the upper prism, the latter may be shifted longitudinally and also laterally, the longitudinal movement being effected by loosening the pair of screws at one end of the prism, while tightening the pair at the opposite end of the prism, and lateral movement of the prism being effected by producing an unequal adjustment of the two screws at each end of the prism so that the prism is moved to the desired position, the seat being wider than the prism to permit the adjustment. This construction also draws the prism firmly to its seat, while permitting the free shifting of the prism upon its seat.

Figure 6:
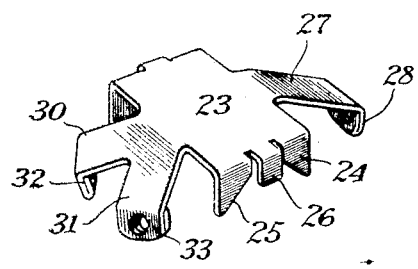
Fig. 6 is a detail perspective view showing a modification of the saddle of the upper prism.
Figure 7:
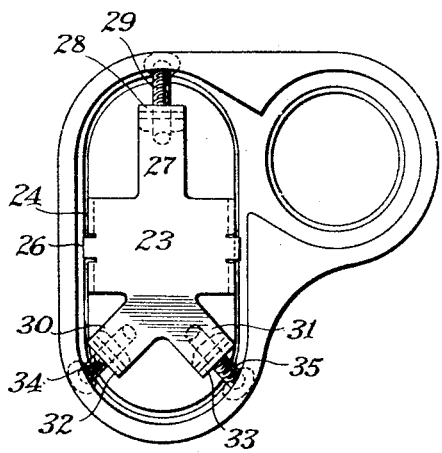
Fig. 7 is a top view, similar to that shown in Fig. 3, showing the modification illustrated in Fig. 6.

Instead of employing four screws, two at each end of the prism, for effecting the longitudinal and lateral movements of the prism 13 on its seat, three screws may be employed for this purpose, as shown in Figs. 6 and 7. In this latter construction, the saddle member has a central portion 23 with a pair of laterally turned and beveled projections 24 and 25 at opposite sides thereof for coöperating with the two angularly arranged faces of the prism 13, and it also has laterally turned projections 26 on opposite sides for coöperating with the opposite sides of the prism 13. On one side of the central portion 23 a spring arm 27 is projected having a nut 28 at its free end for engagement by a screw 29 mounted to turn loosely in the casing 12, while on the opposite side of the central portion 23 two diverging spring arms 30 and 31 are arranged and carry nuts 32 and 33 at their free ends for engagement, respectively, by screws 34 and 35, whose axes intersect the plane of the prism seat and also a plane perpendicular to the prism seat extending in the direction of the longitudinal axis of the prism.

Figure 8:
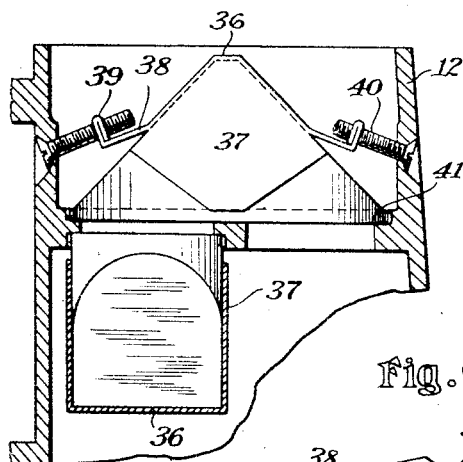
Fig. 8 is a sectional view of still another embodiment of the invention.
Figure 9:
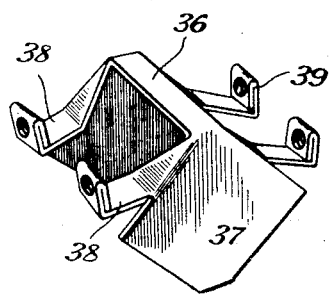
Fig. 9 is a perspective view of the saddle member illustrated in Fig. 8.

Another form for the adjustment for the upper prism is shown in Figs. 8 and 9, the saddle in this form being in one piece and having four adjusting screws. In this form 36 indicates a central portion which coöperates with the apex of the prism and connects side pieces 37 coöperating with the opposite sides of the prism and with the angular faces of the prism. Spring arms 38 are arranged in pairs on opposite sides of the saddle, the members on each side converging toward their free ends and carrying nuts 39. With these nuts the screws 40 engage, said screws turning and also having a rocking movement in the casing 12, the screws on each side having their axes arranged so as to intersect the plane of the prism seat as well as a plane perpendicular to the prism seat extending in the direction of the longitudinal axis of the prism. This arrangement also tends to draw the prism 13 to its seat and at the same time permits the longitudinal as well as the lateral adjustment of the prism.

In all of the illustrated embodiments of the invention the prism is engaged by a means formed in one or two parts and coöperating with opposite angularly arranged faces of the prism. This means carries screw members preferably in the form of nuts and resiliently supported. These nuts are engaged by screw members mounted on a part fixed relatively to the prism seat, said screw members being mounted to rock on such part, but not to move axially. The axes of these screw members intersect the plane of the prism seat, and thus tend to pull the prism toward the seat. In some forms the axes of the screw members also are arranged angularly with reference to a plane perpendicular to the prism seat and extending in the direction of the length of the prism, so that the screw members also tend to pull the prism laterally on the seat at the same time that the prism is being drawn toward the seat.

What I claim as my invention and desire to secure by Letters Patent is:—

1. In an optical instrument, a prism seat, a prism supported on said seat and having angularly arranged faces, means coöperating with both of said faces, two screw parts mounted on said means at opposite ends of the prism to move with said means, two screw parts mounted on a part fixed relatively to the prism seat and coöperating with the first named screw parts to move the prism in opposite directions.

2. In an optical instrument, a prism seat, a prism supported on the seat and having angularly arranged faces, a saddle coöperating with said oppositely arranged faces, and having two screw parts mounted thereon near opposite ends of the prism to move with the saddle, and two screw parts mounted on a part fixed relatively to the prism seat.

3. In an optical instrument, a prism seat, a prism supported on the seat and having two angularly arranged faces, a saddle coöperating with said faces and provided with two screw parts, and two oppositely extending screw parts mounted to move with the saddle engaging said screw parts on the saddle and mounted to turn freely in a part fixed relatively to the seat.

4. In an optical instrument, a prism seat, a prism supported on said seat and having two angularly arranged faces, a saddle coöperating with said faces and provided with two nuts on opposite sides thereof to move with the saddle, and two oppositely extending screws mounted to turn freely in a part fixed relatively to the prism seat and engaging said nuts.

5. In an optical instrument, a prism seat, a prism supported on said seat and having two angularly arranged faces, a saddle coöperating with both of said faces, two screw parts carried by the saddle near opposite ends of the prism, and two screw parts mounted to rotate on a part fixed relatively to the prism seat and coöperating with the screw parts on the saddle, said last named screw parts having their axes of rotation at angles to the plane of the prism seat.

6. In an optical instrument, a prism seat, a prism supported on said seat, a saddle coöperating with said prism, and means for adjusting the prism on its seat comprising two nuts resiliently supported on the saddle, and two oppositely extending screws coöperating with said nuts and mounted to turn loosely and also to rock in a part fixed relatively to the seat with their axes extending at angles to the plane of said seat.

7. In an optical instrument, a prism seat, a prism adjustable thereon, having angularly arranged faces, means coöperating with said angularly arranged faces of said prism, and two pairs of screws, one pair being arranged at one end of said prism and coöperating with said means and the other pair being arranged at the opposite end of the prism and coöperating with said means to adjust the prism laterally on its seat.

8. In an optical instrument, a prism seat, a prism having angularly arranged faces and adjustable longitudinally and also transversely of said seat, a saddle engaging said angularly arranged faces, and means for adjusting the prism embodying a pair of adjusting screws arranged at one end of the prism and coöperating with said saddle to adjust the prism laterally on its seat.

9. In an optical instrument, a prism seat, a prism having angularly arranged faces and adjustable longitudinally and also transversely of said seat, a saddle engaging said angularly arranged faces, and means for adjusting the prism embodying a pair of adjusting screws arranged at one end of the prism and coöperating with said saddle, said screws having their axes arranged at an angle to each other.

10. In an optical instrument, a prism seat, a prism having angularly arranged faces and adjustable longitudinally and also transversely of said seat, a saddle engaging said angularly arranged faces, and means for adjusting the prism embodying a pair of adjusting screws arranged at one end of the prism and coöperating with said saddle, said screws having their axes arranged at an angle to each other and to the prism seat.

11. In an optical instrument, a prism seat, a prism having angularly arranged faces and adjustable longitudinally and also transversely of said seat, a saddle engaging said angularly arranged faces, and means for adjusting the prism embodying a pair of adjusting screws arranged at one end of the prism and coöperating with said saddle, said screws having their axes arranged at an angle to the prism seat.

12. In an optical instrument, a prism seat, a prism having angularly arranged faces and adjustable longitudinally of the seat, a saddle coöperating with the angular faces of the prism and carrying a screw member, and means for adjusting the prism embodying a screw member mounted on a part fixed relatively to the prism seat and having its axis intersecting the prism seat, said screw member being held against movement in the direction of its axis.

13. In an optical instrument, a prism seat, a prism having angularly arranged faces and adjustable longitudinally and transversely of the seat, and means for adjusting said prism embodying a pair of screw members arranged at one end of the prism, means for supporting said screw members on the prism, and a pair of screws coöperating with the first named screw members and having their axes converging and engaging said screw members supported on the prism.

14. In an optical instrument, a prism seat, a prism supported on said seat and having two angularly arranged faces, a saddle coöperating with said faces, two pairs of screw members arranged on said saddle, and two pairs of coöperating screw members mounted on a part fixed with reference to the seat, said two pairs of screw members being arranged at opposite ends of the prism and the members of each pair having their axes converging.

15. In an optical instrument, a prism seat, a prism supported on said seat and having two angularly arranged faces, and means for adjusting said prism embodying two coöperating screw parts, one connected to the prism to move therewith and the other mounted on a part fixed with reference to the prism seat and having its axis at an angle to the prism seat.

16. In an optical instrument, a prism seat, a prism supported on said seat and having two angularly arranged faces, and means for adjusting said prism embodying two coöperating screw parts, one connected to the prism to move therewith and the other mounted on a part fixed with reference to the prism seat and having its axis at an angle to a plane perpendicular to the prism seat and extending in the direction of the length of the prism.

17. In an optical instrument a prism seat, a prism supported on the seat, and having angularly arranged faces, a saddle for the prism having spring arms engaging the angularly arranged faces of the prism, and means coöperating with the saddle for adjusting the prism on its seat.

18. In an optical instrument a prism seat, a prism supported on the seat and having angularly arranged faces, a saddle for the prism having oppositely extending spring arms engaging each of the angularly arranged faces, and means coöperating with the saddle for adjusting the prism.

19. In an optical instrument, a prism seat, a prism supported on the seat and having angularly arranged faces, a saddle for the prism having oppositely extending spring arms provided with nuts and screws engaging said nuts to adjust the prism on its seat.

GEORGE REISINGER.

Copies of this patent may be obtained for five cents each, by addressing the "Commissioner of Patents, Washington, D. C."